United States Patent
Watanabe et al.

(10) Patent No.: US 10,031,223 B2
(45) Date of Patent: Jul. 24, 2018

(54) VEHICLE CONTROL APPARATUS AND VEHICLE

(71) Applicant: DENSO CORPORATION, Kariya, Aichi-pref. (JP)

(72) Inventors: Yuu Watanabe, Toyota (JP); Takashi Watanabe, Nagoya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 379 days.

(21) Appl. No.: 14/591,246

(22) Filed: Jan. 7, 2015

(65) Prior Publication Data

US 2015/0192666 A1 Jul. 9, 2015

(30) Foreign Application Priority Data

Jan. 8, 2014 (JP) ................. 2014-001553

(51) Int. Cl.
*G01S 13/93* (2006.01)
*G01S 13/87* (2006.01)

(52) U.S. Cl.
CPC ............ *G01S 13/931* (2013.01); *G01S 13/87* (2013.01); *G01S 2013/9332* (2013.01); *G01S 2013/9375* (2013.01); *G01S 2013/9378* (2013.01); *G01S 2013/9385* (2013.01)

(58) Field of Classification Search
CPC .................. G01S 13/931; G01S 13/87; G01S 2013/9314–2013/9396
See application file for complete search history.

(56) References Cited

U.S. PATENT DOCUMENTS 5,325,096 A 6/1994 Pakett
5,517,196 A * 5/1996 Pakett ................. G01S 13/52
342/70

(Continued)

FOREIGN PATENT DOCUMENTS

EP 1934630 B1 * 2/2014 .......... G01S 15/931
JP 06-168398 6/1994

(Continued)

OTHER PUBLICATIONS

"Intelligent Transport Systems—Lane Change Decision Aid System (LCDAS)—Performance Requirements and Test Procedures"; ISO 17387, May 1, 2008.

*Primary Examiner* — Matthew M Barker
(74) *Attorney, Agent, or Firm* — Harness, Dickey & Pierce, P.L.C.

(57) ABSTRACT

In a vehicle control apparatus, a rear side detecting unit, mounted to an own vehicle, detects another vehicle that is present in a first area behind and to a side of the own vehicle. A time acquiring unit, mounted to the own vehicle, acquires a first time that is an estimated time at which a front approaching vehicle will arrive at the first area. The front approaching vehicle is another vehicle that is relatively nearing the own vehicle from ahead of the own vehicle. A sensitivity setting unit, mounted to the own vehicle, sets a detection sensitivity of the rear side detecting unit to the other vehicle in at least a part of the first area in such a manner that the detection sensitivity during a predetermined period set based on the first time is higher than the detection sensitivity during a remaining period other than the predetermined period.

11 Claims, 8 Drawing Sheets

(56) References Cited

U.S. PATENT DOCUMENTS

| | | | | |
|---|---|---|---|---|
| 5,530,447 | A * | 6/1996 | Henderson | G01S 13/931 340/904 |
| 6,784,828 | B2 * | 8/2004 | Delcheccolo | B60K 31/0008 340/436 |
| 7,492,282 | B2 * | 2/2009 | Danz | B60Q 9/006 340/932.2 |
| 8,031,062 | B2 * | 10/2011 | Smith | G08G 1/166 340/438 |
| 8,081,539 | B2 * | 12/2011 | Faber | G01S 7/52006 367/902 |
| 9,139,135 | B2 * | 9/2015 | Assaf | B60R 1/12 |
| 9,625,578 | B2 * | 4/2017 | Schoenherr | G01S 15/931 |
| 2006/0077052 | A1 | 4/2006 | Matsuoka | |
| 2006/0155469 | A1 | 7/2006 | Kawasaki | |
| 2008/0147316 | A1 | 6/2008 | Okawa | |
| 2010/0141413 | A1 | 6/2010 | Suzuki | |
| 2013/0100287 | A1 * | 4/2013 | Chien | G08G 1/167 348/148 |
| 2013/0113923 | A1 * | 5/2013 | Chien | B60R 1/00 348/135 |

FOREIGN PATENT DOCUMENTS

| | | |
|---|---|---|
| JP | 2005-028992 | 2/2005 |
| JP | 2006-088896 | 4/2006 |
| JP | 2008-171082 | 7/2008 |
| JP | 2008152387 A | 7/2008 |

* cited by examiner

VEHICLE CONTROL APPARATUS AND VEHICLE

CROSS-REFERENCE TO RELATED APPLICATION

This application is based on and claims the benefit of priority from Japanese Patent Application No. 2014-001553, filed Jan. 8, 2014, the disclosure of which is incorporated herein in its entirety by reference.

BACKGROUND

Technical Field

The present invention relates to a vehicle control apparatus and a vehicle.

Related Art

A vehicle control apparatus is known that uses a sensor, such as a millimeter-wave radar, to detect an object that is present ahead of or behind and to the side of a vehicle. The vehicle control apparatus then performs a predetermined control on the vehicle based on the detection results (for example, refer to JP-2008-171082). For example, pre-crash safety (referred to, hereinafter, as "PCS" (registered trademark)) is known as a type of control that is performed based on the detection result of an object ahead of the vehicle. In PCS control, the vehicle is made to perform an operation when the likelihood of a collision between the vehicle and the object detected ahead of the vehicle is determined to be high. The operation that is performed is, for example, an operation to avoid collision (such as a warning or automatic braking) or an operation to reduce impact caused by a collision (such as automatic braking or automatic seatbelt retraction).

In addition, for example, blind spot monitoring (referred to, hereinafter, as "BSM") is known as a type of control that is performed based on the detection result of an object present behind and to the side of the vehicle. In BSM control, the vehicle is made to perform an operation when another vehicle is detected in a target area. The target area is relatively near the vehicle and is a blind spot behind and to the side of the vehicle. The operation that is performed is, for example, an operation to notify the driver by light, sound, vibrations, or the like that another vehicle is present (an operation that calls for attention, gives warning, or the like). BSM is also referred to as blind spot warning (BSW).

Situations in which another vehicle enters the target area for BSM control are as follows. In a first situation, the other vehicle enters the target area from behind in accompaniment with the other vehicle overtaking the vehicle that performs BSM control. In a second situation, the other vehicle enters the target area from the front in accompaniment with the vehicle that performs BSM control overtaking the other vehicle.

As described above, BSM control uses the detection results of objects present behind and to the side of the vehicle acquired from a sensor. In the first situation, the other vehicle enters the target area from behind, which is located within the detection range of the sensor. Therefore, in the first situation, BSM control can be performed with a certain amount of accuracy or higher.

However, in the second situation, the other vehicle enters the target area from the front, which is located outside of the detection range of the sensor. Therefore, in the second situation, the accuracy of BSM control may decrease. In this way, it may be difficult to perform BSM control with high accuracy in both the first and second situations.

In addition, it is difficult for the sensor used in BSM control to differentiate between a state in which the cruising vehicle is approaching an area on the road in which a wall is present from an area in which a wall is not present, and a state in which the vehicle is overtaking another vehicle. Therefore, the following situations may occur.

For example, regardless of the vehicle actually merely approaching an area on the road in which a wall is present, a determination may be made in BSM control that another vehicle is present within the target area. An unnecessary warning operation may be performed. Conversely, regardless of another vehicle being present within the target area, a determination may be made that a wall is present within the target area. The warning operation may not be performed.

As described above, the conventional technologies have room for improvement regarding improved performance of BSM control. The above-described issue is not limited to BSM control. Rather, the issue is a common issue in control operations in which another vehicle is detected in an area behind and on the left/right side of the vehicle.

SUMMARY

It is thus desired to solve at least a part of the above-described issues. The present disclosure can be actualized by the following exemplary embodiments.

An exemplary embodiment provides a vehicle control apparatus that includes a rear side detecting unit, a time acquiring unit, and a sensitivity setting unit. The rear side detecting unit is mounted to an own vehicle and detects another vehicle that is present in a first area behind and to a side of the own vehicle. The time acquiring unit is mounted to the own vehicle and acquires a first time that is an estimated time at which a front approaching vehicle will arrive at the first area. The front approaching vehicle is another vehicle that is relatively nearing the own vehicle from ahead of the own vehicle. The sensitivity setting unit is mounted to the own vehicle and sets a detection sensitivity of the rear side detecting unit to the other vehicle in at least a part of the first area in such a manner that the detection sensitivity during a predetermined period set based on the first time is higher than the detection sensitivity during a remaining period other than predetermined period.

In the vehicle control apparatus, the detection sensitivity of the other vehicle in at least a part of the first area is set in such a manner that the detection sensitivity during the predetermined period set based on the first time is higher than the detection sensitivity during the remaining period other than the predetermined period. The first time is the estimated time at which the front approaching vehicle arrives at the first area behind and to the side of the own vehicle. Therefore, even when the front approaching vehicle enters the first area from the front in accompaniment with the own vehicle overtaking the front approaching vehicle, the likelihood of the front approaching vehicle being detected can be increased.

In addition, conversely, the detection sensitivity of the other vehicle in at least a part of the first area is set in such a manner that the detection sensitivity during the above-described remaining period is lower than the detection sensitivity during the above-described predetermined period. Therefore, during an expected situation in which a front approaching vehicle enters the first area from the front in accompaniment with the own vehicle overtaking the front approaching vehicle, a situation can be suppressed in which another vehicle is erroneously determined to be present when, for example, the own vehicle has actually merely approached an area on the road in which a wall is present and another vehicle is not present in the first area.

Therefore, in the vehicle control apparatus, the accuracy of detection of another vehicle present in the first area behind and to the side of the own vehicle can be improved. In addition, the accuracy of BSM control in which, for example, a predetermined notification operation is performed when another vehicle is detected in the first area can be improved.

Not all of the plurality of constituent elements included in the exemplary embodiment of the above-described present disclosure are essential. Some constituent elements among the plurality of constituent elements may be modified, omitted, exchanged with other new constituent elements, or be modified to remove some limitations as appropriate to solve some or all of the above-described issues or to achieve some or all of the effects described in the present specification. In addition, some or all of the technical features included in an aspect of the above-described present disclosure may be combined with some or all of the technical features included in another aspect of the above-described present disclosure, thereby forming a separate aspect of the present disclosure, to solve some or all of the above-described issues or to achieve some or all of the effects described in the present specification.

The present disclosure can be actualized by various exemplary embodiments other than the vehicle control apparatus. For example, the present disclosure can be actualized by exemplary embodiments such as a vehicle control method, a vehicle control system, or a vehicle including the vehicle control apparatus or vehicle control system.

DESCRIPTION OF EMBODIMENTS

An embodiment of the present disclosure will hereinafter be described with reference to the drawings.

A. Embodiment

A-1. Configuration of a Vehicle

Figure 1:
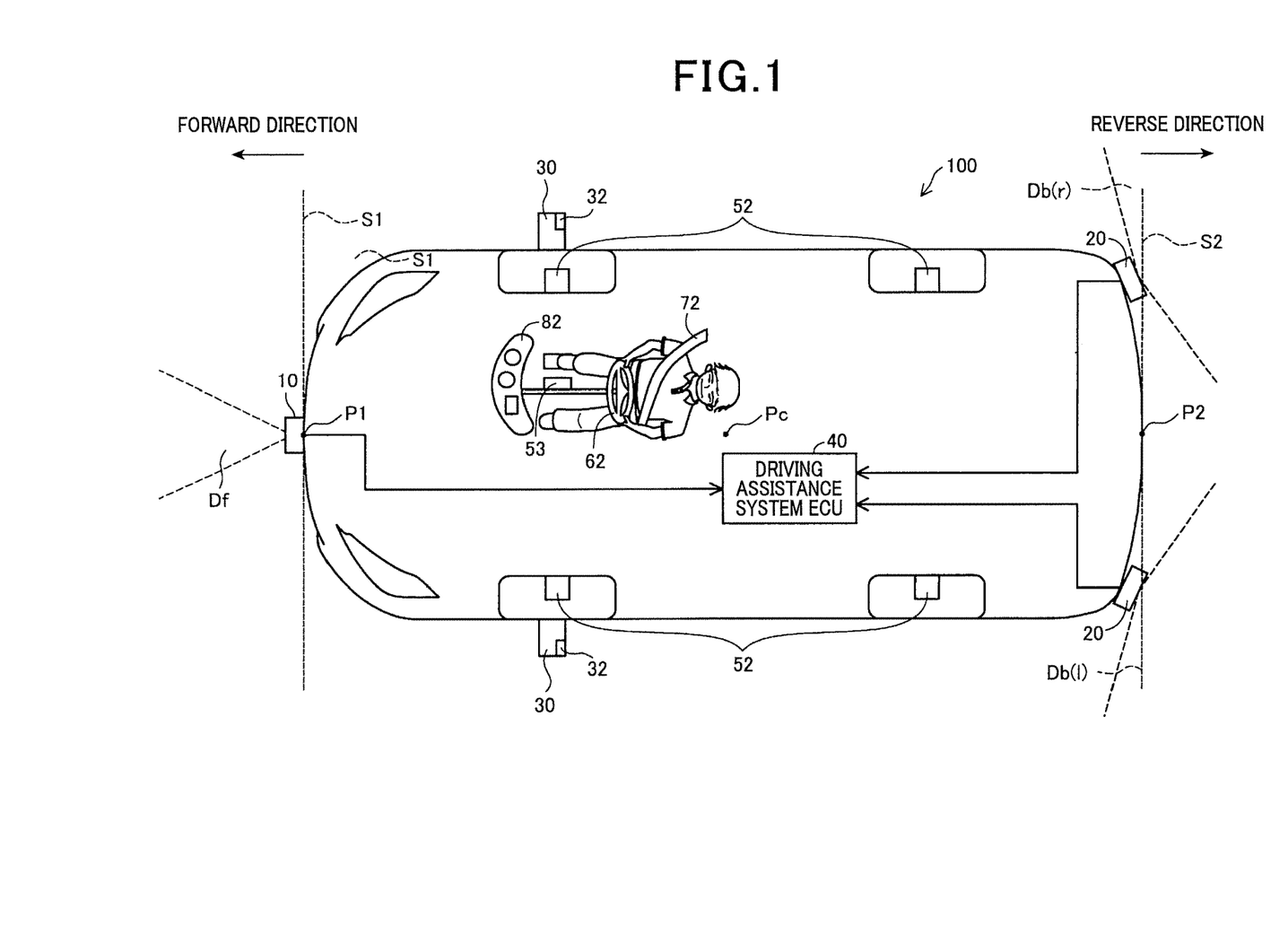
FIG. 1 is an explanatory diagram schematically showing a configuration of a vehicle according to an embodiment.
Figure 2:
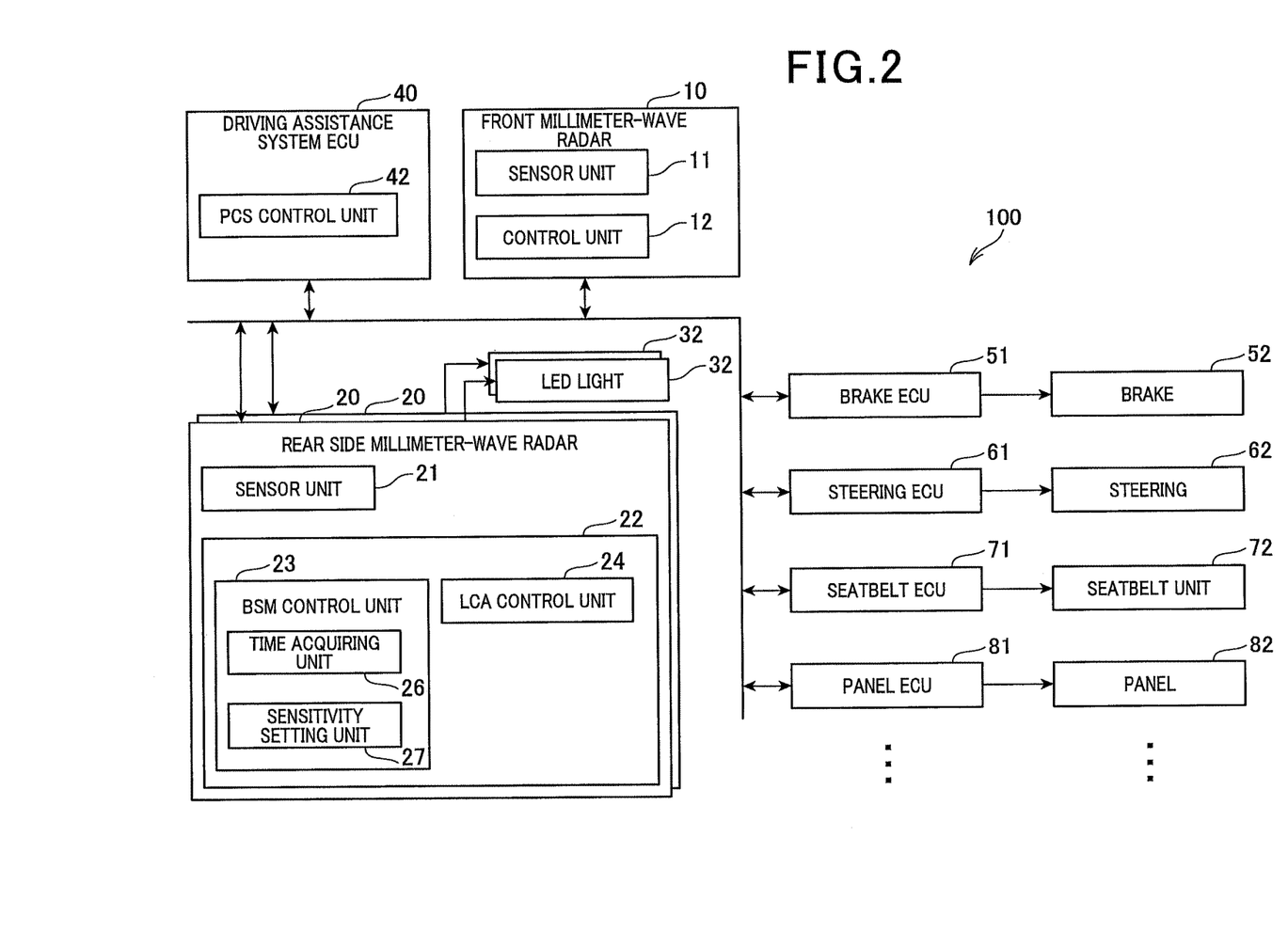
FIG. 2 is an explanatory diagram schematically showing a configuration of the vehicle according to the embodiment.

As shown in FIGS. 1 and 2, a vehicle (own vehicle) 100 according to the embodiment of the present disclosure includes a brake 52, a steering unit 62, a seatbelt unit 72, an instrument panel (referred to, hereinafter, as simply a "panel") 82, and light-emitting diode (LED) lights 32. The brake 52 decelerates (stops) the vehicle 100 based on operation of a brake pedal 53. The steering unit 62 steers the vehicle 100. The seatbelt unit 72 restrains a passenger to a seat. The panel 82 displays various types of information. The LED lights 32 are disposed in left and right side view mirrors 30.

In addition, the vehicle 100 includes three millimeter-wave radars (a single front millimeter-wave radar 10 and two rear side millimeter-wave radars 20). The millimeter-wave radars 10 and 20 each use millimeter-wave band radio waves to detect whether or not an object (such as a vehicle or a wall) is present within a detection range.

The millimeter-wave radars 10 and 20 each also detect (when an object is present) the distance between the vehicle 100 and the object, the orientation of the object from the perspective of the vehicle 100, and the relative speed of the object in relation to the vehicle 100. As shown in FIG. 2, the millimeter-wave radars 10 and 20 respectively include sensor units 11 and 21 and control units 12 and 22. The sensor units 11 and 21 each perform transmission and reception of radio waves through an antenna, as well as various types of signal processing.

The control units 12 and 22 each perform various types of control, including BSM, and detection such as those described above, based on the signals outputted from the sensor units 11 and 12. The control units 12 and 22 each include a central processing unit (CPU) and a storage area. The CPU runs a program stored in the storage area, thereby actualizing control by the respective control unit 12 or 22. The control unit 22 of the rear side millimeter-wave radar 20 includes a BSM control unit 23 and a lane change alert (referred to, hereinafter, as "LCA") control unit 24. The BSM control unit 23 performs BSM control.

The LCA control unit 24 performs LCA control. The BSM control unit 23 includes a time acquiring unit 26 and a sensitivity setting unit 27. The functions of each unit will be described based on the flow described hereafter.

The rear side millimeter-wave radar 20 on the right side is connected to the LED light 32 in the right side view mirror 30 by a control signal line. In addition, the rear side millimeter-wave radar 20 on the left side is connected to the LED light 32 in the left side view mirror 30 by a control signal line.

As shown in FIG. 1, a detection range Df of the front millimeter-wave radar 10 is an area ahead of the vehicle 100. In the present specification, "ahead of the vehicle 100" refers to a part of an area or the overall area in the forward direction of the vehicle 100 from a virtual plane (referred to, hereinafter, as a "first plane S1"). The first plane S1 passes through an arbitrary first point P1 on the vehicle 100 and is perpendicular to the front/rear direction of the vehicle 100.

In addition, a detection range Db(r) of one of the two rear side millimeter-wave radars 20 is an area in a rear right side of the vehicle 100, and another detection range Db(1) is an area in a rear left side of the vehicle 100. In the present specification, "behind the vehicle 100" refers to a part of an area or the overall area in the reverse direction from a virtual plane (referred to, hereinafter, as a "second plane S2"). The second plane S2 passes through a second point P2 on the vehicle 100 and is perpendicular to the front/rear direction of the vehicle 100. The second point P2 is set further towards the reverse direction than the first point P1.

In the present specification, "right side of the vehicle 100" refers to a part of an area or the overall area that is on the right side of a center point Pc of the vehicle 100 in the forward direction, within an area between the first plane S1 and the second plane S2. In the present specification, "left side of the vehicle 100" refers to a part of an area or the overall area that is on the left side of the center point Pc of the vehicle 100 in the forward direction, within the area between the first plane S1 and the second plane S2.

In addition, a combined area of an area behind the vehicle 100, an area in the left side of the vehicle 100, and an area in the right side of the vehicle 100 is referred to as rear side area. Hereafter, a detection range covered by the two rear side millimeter-wave radars 20 is also simply referred to as a detection range Db.

As shown in FIG. 2, the vehicle 100 includes a brake electronic control unit (ECU; the same applies hereafter) 51, a steering ECU 61, a seatbelt ECU 71, a panel ECU 81, and a driving assistance system ECU 40. The brake ECU 51 controls the brake 52. The steering ECU 61 controls the steering unit 62. The seatbelt ECU 71 controls the seatbelt unit 72. The panel ECU 81 controls the panel 82. Each ECU includes a central processing unit (CPU) and a storage area. The CPU runs a program stored in the storage area, thereby actualizing control by the respective ECU. The ECUs and the sensors are connected to each other by an on-board network referred to as a controller area network (CAN), dedicated control signal lines, or the like.

The driving assistance ECU 40 acquires the detection results from the millimeter-wave radars 10 and 20. The driving assistance system ECU 40 then performs various types of control to assist in driving of the vehicle 100 based on the acquired detection results. The driving assistance system ECU 40 includes a PCS control unit 42. The PCS control unit 42 performs PCS control. The rear side millimeter-wave radars 20 or a combination of the rear side millimeter-wave radars 20 and the driving assistance system ECU 40 according to the present embodiment corresponds to a vehicle control apparatus in the present disclosure.

Figure 3:
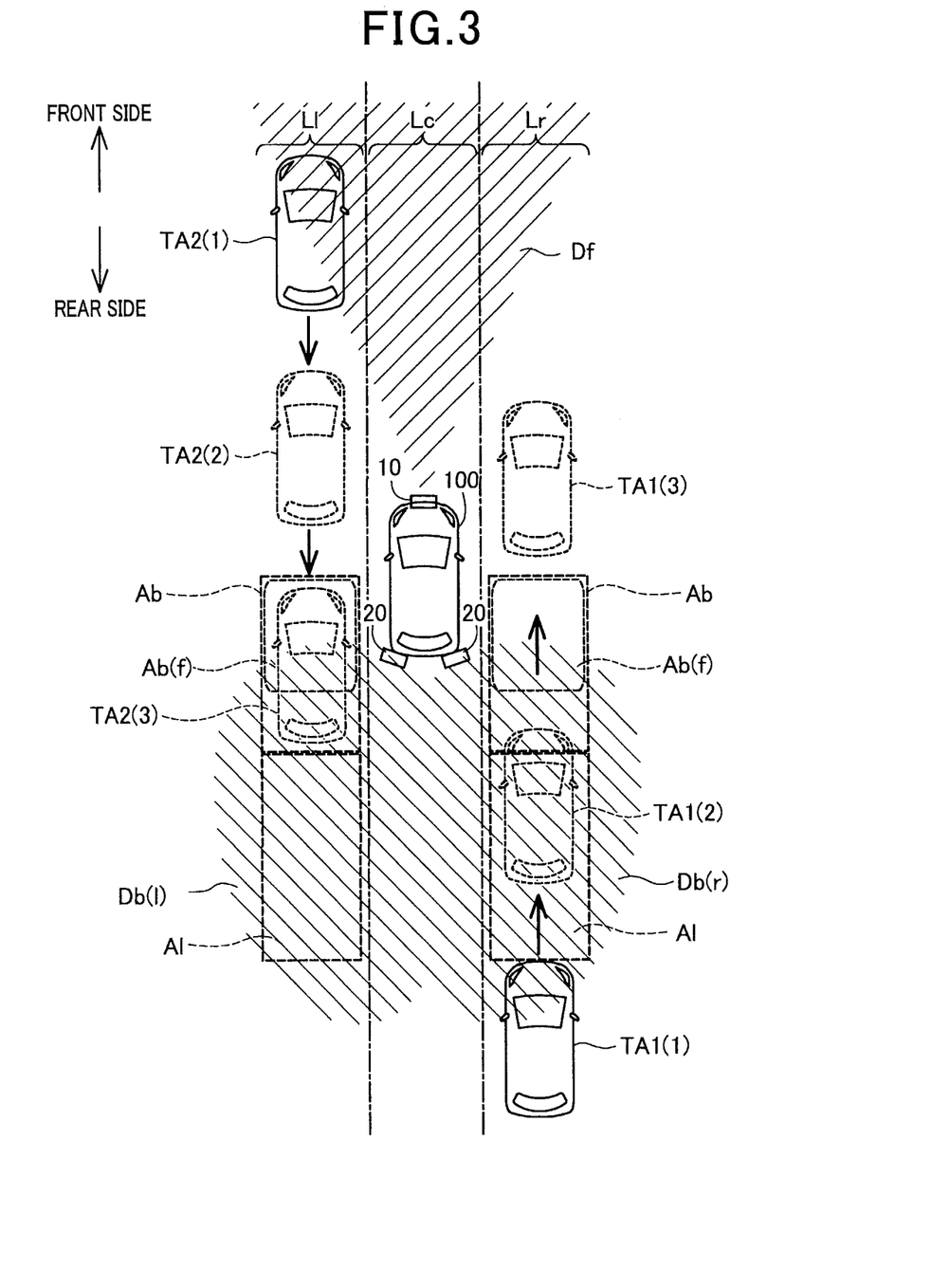
FIG. 3 is an explanatory diagram showing the details of each type of driving assistance control.

FIG. 3 is a diagram for explaining the details of each type of driving assistance control, described above. FIG. 3 shows the relative positional relationships among the vehicle 100 and other vehicles TA1 and TA2. The vehicle 100 is traveling in a center vehicle lane Lc. The other vehicles TA1 and TA2 are respectively traveling in vehicle lanes Lr and Ll that are adjacent to the center vehicle lane Lc.

The first other vehicle TA1 is traveling in the vehicle lane Lr that is to the right of the center vehicle lane Lc. The first other vehicle TA1 overtakes the vehicle 100. When the first other vehicle TA1 overtakes the vehicle 100, the relative position of the first other vehicle TA1 in relation to the position of the vehicle 100 moves from a position indicated by TA1(1), through a position indicated by TA1(2), to a position indicated by TA1(3).

In addition, the second other vehicle TA2 is traveling in the vehicle lane Ll that is to the left of the center vehicle lane Lc. The second other vehicle TA2 is overtaken by the vehicle 100. When the second other vehicle TA2 is overtaken by the vehicle 100, the relative position of the second other vehicle TA2 in relation to the position of the vehicle 100 moves from a position indicated by TA2(1), through a position indicated by TA2(2), to a position indicated by TA2(3).

The BSM control unit 23 of the control unit 22 of the rear side millimeter-wave radar 20 performs BSM control. For example, in BSM control, the rear side millimeter-wave radar 20 may detect another vehicle TA in target areas Ab (areas in both adjacent vehicle lanes Lr and Ll of which the distance from the vehicle 100 is within several meters). The target area Ab is relatively near the vehicle 100 and is a blind spot behind and to the side of the vehicle 100. In this instance, in BSM control, the vehicle 100 is made to perform an operation (an operation that calls for attention, gives warning, or the like) to notify the driver of the presence of the other vehicle TA.

Specifically, the BSM control unit 23 performs control directly or through the ECUs to make the vehicle 100 perform one or a plurality of the following notification operations.

(1) Control to emit light (including images) or sound from the LED light 32, the panel 82, or the like of the vehicle 100.

(2) Control to vibrate a part that comes into contact with the driver, for example, the steering wheel of the steering unit 62.

A part of the target area Ab on the front side (near the vehicle 100; the same applies hereafter) is referred to as a front target area Ab(f). The front target area Ab(f) will be described hereafter. In addition, the BSM control unit 23 that performs BSM corresponds to a rear side detecting unit in the present disclosure.

The LCA control unit 24 of the control unit 22 of the rear side millimeter-wave radar 20 performs LCA control. For example, in LCA control, the rear side millimeter-wave radar 20 may detect another vehicle TA in target areas Al (areas in both adjacent vehicle lanes Lr and Ll of which the distance from the vehicle 100 is within about 150 meters). The target area Al is further to the rear of the target area Ab for BSM control.

Based on the distance from the vehicle 100 and the relative speed in relation to the vehicle 100 of the detected other vehicle TA, a predicted collision time TTC is calculated. The predicted collision time TTC refers to the amount of time until a predicted time at which a collision between the vehicle 100 and the other vehicle TA occurs. A determination may be made that the likelihood of a collision with the other vehicle TA will be high if the vehicle 100 changes vehicle lanes, because the predicted collision time TTC is short.

In this instance, in LCA control, the vehicle 100 is made to perform an operation (an operation that calls for attention, gives warning, or the like) to notify the driver of the high likelihood of collision. Specific examples of the notification operation are similar to those for BSM, described above. The LCA control unit 24 that performs LCA corresponds to a second rear side detecting unit in the present disclosure. In addition, LCA is also referred to as closing vehicle warning (CVW).

The PCS control unit 42 of the driving assistance system ECU 40 performs PCS control. For example, in PCS control, the front millimeter-wave radar 10 may detect an object (such as another vehicle TA) ahead of the vehicle 100. Based on the distance from the vehicle 100 and the relative speed in relation to the vehicle 100 of the detected object, the predicted collision time TTC is calculated.

The predicted collision time TTC refers to the amount of time until a predicted time at which a collision between the vehicle 100 and the object occurs. The predicted collision time TTC refers to the amount of time until the time at which a collision between the vehicle 100 and the other vehicle TA is predicted. A determination may be made that the likelihood of a collision with the object will become high if the vehicle 100 changes vehicle lanes, because the predicted collision time TTC is short.

In this instance, in PCS control, the vehicle 100 is made to perform an operation to avoid collision or to reduce the impact caused by the collision. Specifically, the PCS control unit 42 performs control to make the vehicle 100 perform one or a plurality of the following operations as the operation for avoiding collision or the operation for reducing the impact caused by the collision.

(1) Control to increase assistance hydraulic pressure in the brake 52 and improve responsiveness of the brake 52 to operation of the brake pedal 53.

(2) Control to decelerate (or stop) the vehicle 100 by automatically applying the brake 52 (regardless of the state of the brake pedal 53).

(3) Control to perform automatic steering by the steering unit 62 so that the advancing direction of the vehicle 100 is changed to a direction in which collision with the object is avoided.

(4) Control to vibrate a part that comes into contact with the driver, for example, the steering wheel of the steering unit 62 to warn the driver.

(5) Control to reduce the movement of a passenger during a collision by automatically retracting the seatbelt of the seatbelt unit 72.

(6) Control to emit light or sound from the panel 82 or another part of the vehicle 100 to warn the driver.

As described above, in the vehicle 100 according to the present embodiment, BSM control and LCA control are performed using the detection results from the same millimeter-wave radars (the rear side millimeter-wave radars 20). In other words, the detection range Db of the rear side millimeter-wave radar 20 encompasses at least a part of the target area Ab for BSM control and at least a part of the target area Al for LCA control. To perform both BSM control and LCA control with high accuracy, according to the present embodiment, the rear side millimeter-wave radars 20 are each set so that sensitivity becomes higher closer to the rear (the reverse direction side of the vehicle 100; the same applies hereafter) of the target area Ab for BSM control.

As shown in FIG. 3, instances in which another vehicle TA enters the target area Ab for BSM control are as follows. In a first situation, in a manner similar to the first other vehicle TA1, the other vehicle TA1 enters the target area Ab from behind in accompaniment with the other vehicle TA1 overtaking the vehicle 100. In a second situation, in a manner similar to the second other vehicle TA2, the other vehicle TA2 enters the target area Ab from the front in accompaniment with the vehicle 100 overtaking the other vehicle.

In the first situation, the other vehicle TA1 is present within the detection range of the rear side millimeter-wave radar 20 before entering the target area Ab for BSM control. In addition, the other vehicle TA1 enters the target area Ab by passing through a position at which the sensitivity of the rear side millimeter-wave radar 20 is relatively high. Therefore, it is relatively easy to perform BSM control with high accuracy.

On the other hand, in the second situation, the other vehicle TA2 enters the target area Ab for BSM control from outside of the detection range of the rear side millimeter-wave radar 20, without passing through a position at which the sensitivity of the rear side millimeter-wave radar 20 is relatively high. Therefore, it is relatively difficult for BSM control to be performed with high accuracy.

According to the present embodiment, regarding the rear side boundary of the target area Ab, when at least a part of the other vehicle TA1 is present further within the boundary of the target area Ab, the other vehicle TA1 is determined to be present within the target area Ab. BSM control is thereby performed. On the other hand, regarding the front side boundary of the target area Ab, when the overall other vehicle TA1 is present further within the boundary of the target area Ab, the other vehicle TA1 is determined to be present within the target area Ab. BSM control is thereby performed.

However, regarding the rear side boundary, when the overall other vehicle TA1 is present further within the boundary of the target area Ab, the other vehicle TA1 may be determined to be present within the target area Ab. Regarding the front side boundary, when at least a part of the other vehicle TA1 is present further within the boundary of the target area Ab, the other vehicle TA1 may be determined to be present within the target area Ab.

Figure 4:
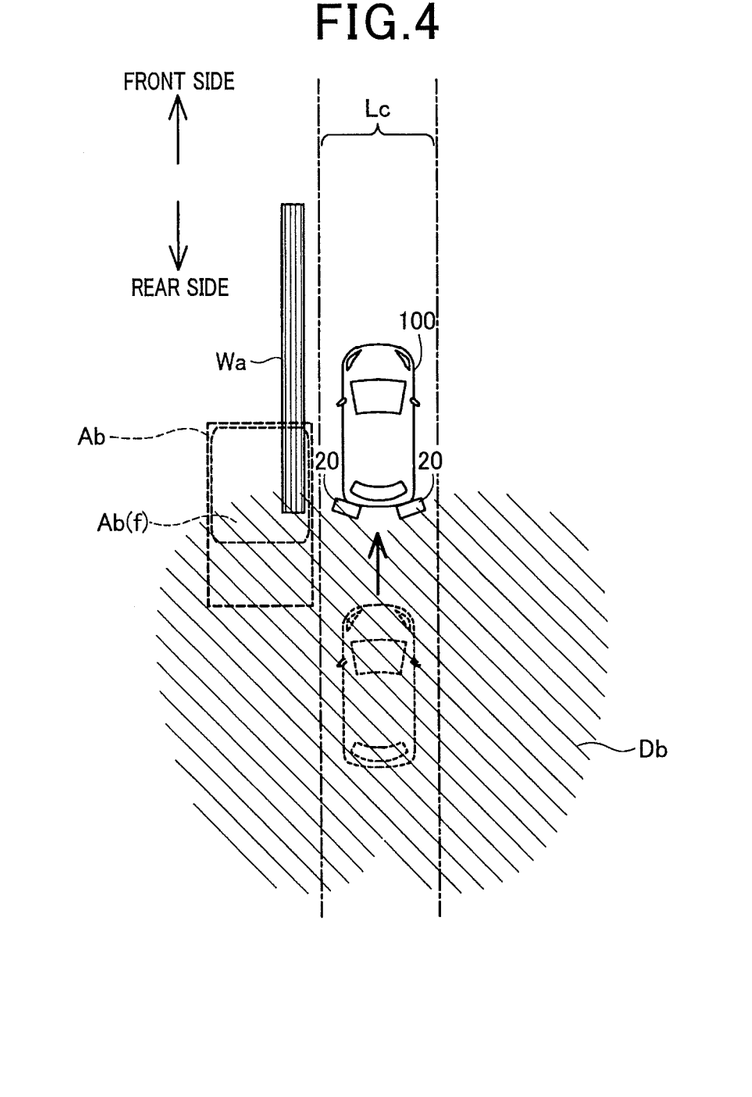
FIG. 4 is an explanatory diagram showing the details of each type of driving assistance control.

In addition, it is difficult for the rear side millimeter-wave radar 20 used for BSM control to differentiate between a state, such as that shown in FIG. 4, in which the cruising vehicle 100 is approaching an area on the road in which a wall Wa is present from an area in which the wall Wa is not present and a state in which the vehicle 100 is overtaking the second other vehicle TA2 in FIG. 3 because the two situations are extremely similar.

Therefore, the following situations may occur. For example, there is risk of the following situations occurring. For example, regardless of the vehicle 100 actually merely approaching an area on the road in which a wall Wa is present, a determination may be made in BSM control that another vehicle TA is present within the target area Ab. An unnecessary warning operation may be performed. Conversely, regardless of another vehicle TA being present within the target area Ab, a determination may be made that a wall Wa is present within the target area Ab. The warning operation may not be performed.

According to the present embodiment, a driving assistance control process including BSM control, such as that described hereafter, is performed so that BSM control can be performed with high accuracy in any situation including the situations described above.

A-2. Driving Assistance Control Process

The vehicle 100 performs a predetermined reset process when the ignition is turned ON. The vehicle 100 then repeatedly performs the driving assistance control process shown in FIG. 5 until the ignition is turned OFF.

Figure 5:
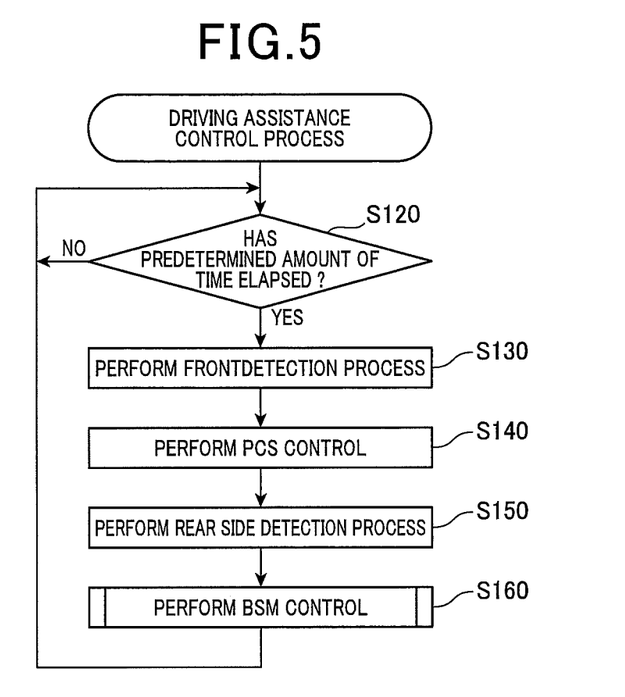
FIG. 5 is a flowchart of the flow of a driving assistance control process.

First, the driving assistance system ECU 40 of the vehicle 100 waits until a predetermined amount of time has elapsed (step S120). When determined that the predetermined amount of time has elapsed (YES at step S120), the driving assistance system ECU 40 makes the control unit 12 of the front millimeter-wave radar 10 perform a front detection process (step S130).

In the front detection process, the control unit 12 uses the sensor unit 11 of the front millimeter-wave radar 10 to determine whether or not an object, such as another vehicle TA, is present ahead of the vehicle 100. In addition, when determined that an object is present, the control unit 12 detects the distance from the vehicle 100 to the object, the orientation of the object from the perspective of the vehicle 100, and the relative speed of the object in relation to the vehicle 100.

Next, the PCS control unit 42 of the driving assistance system ECU 40 performs the above-described PCS control based on the results of the forward detection process (step S140). Next, the driving assistance ECU 40 makes the control unit 22 of the rear side millimeter-wave radar 20 perform a rear side detection process (step S150).

In the rear side detection process, the control unit 22 uses the sensor unit 21 of the rear side millimeter-wave radar 20 to detect whether or not an object, such as another vehicle TA, is present behind and on the left/right side of the vehicle 100. In addition, when determined that an object is present, the control unit 22 detects the distance from the vehicle 100 to the object, the orientation of the object from the perspective of the vehicle 100, and the relative speed of the object in relation to the vehicle 100.

Next, the BSM control unit 23 of the control unit 22 of the rear side millimeter-wave radar 20 performs BSM control based on the results of the rear side detection process (step S160).

Figure 6:
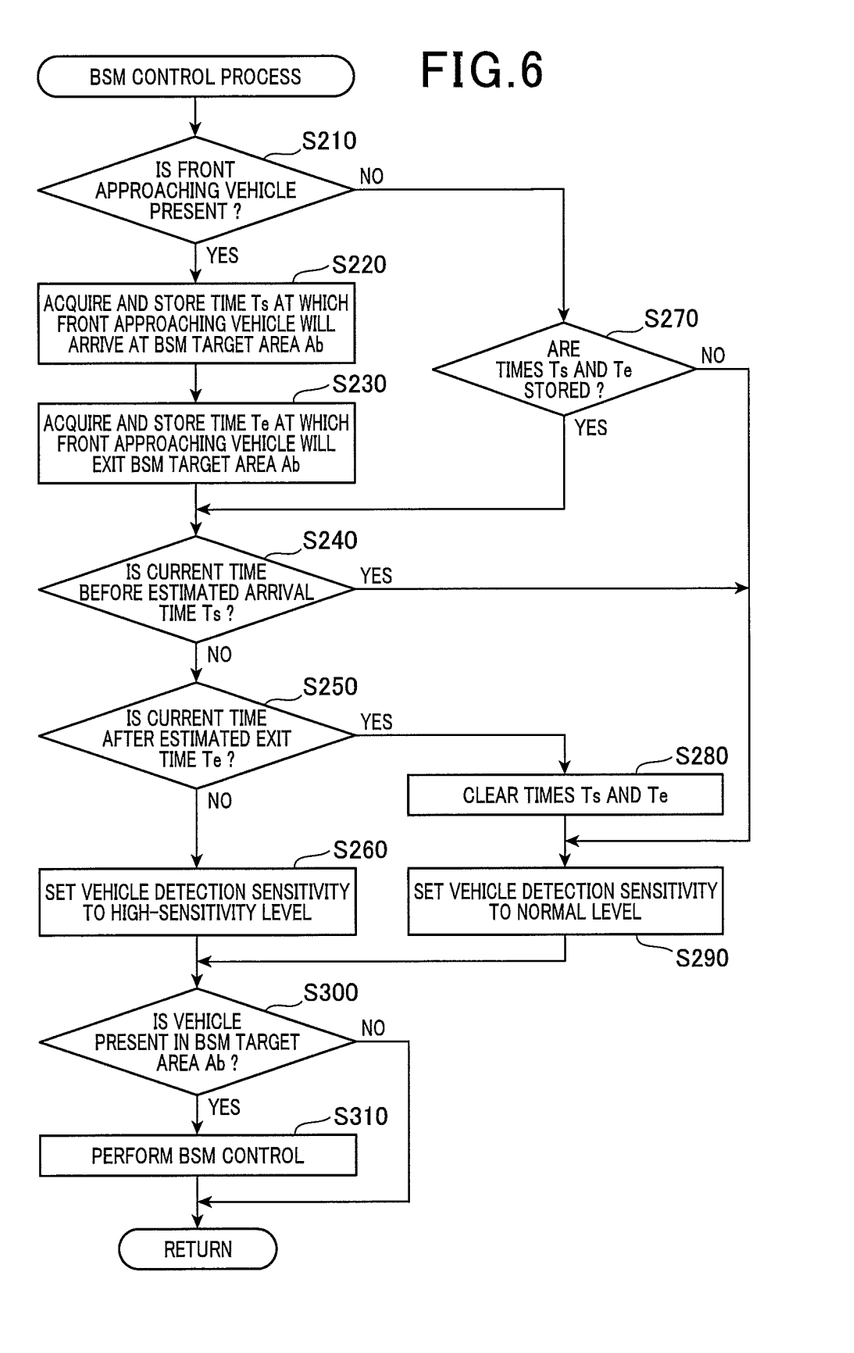
FIG. 6 is a flowchart of the flow of a BSM control process.

As shown in FIG. 6, in BSM control, first, the BSM control unit 23 uses the results of the front detection process (step S130 in FIG. 5) acquired from the control unit 12 of the front millimeter-wave radar 10 and determines whether or not a front approaching vehicle is present (step S210). A front approaching vehicle refers to another vehicle TA that is relatively nearing the vehicle 100 in the adjacent vehicle lane Lr or Ll ahead of the vehicle 100. For example, when the second other vehicle TA2 shown in FIG. 3 is present in the position TA2(1), the second other vehicle TA2 is detected as the front approaching vehicle.

When determined that a front approaching vehicle is present (YES at step S210), the time acquiring unit 26 of the BSM control unit 23 acquires an estimated time at which the front approaching vehicle will arrive at the target area Ab for BSM control (referred to, hereinafter, as an "estimated arrival time Ts"). The time acquiring unit 26 then stores the estimated arrival time Ts in a predetermined storage area (step S220). The estimated arrival time Ts corresponds to a first time in the present disclosure.

The time acquiring unit 26 uses the position of the front approaching vehicle acquired from the control unit 12 of the front millimeter-wave radar 10 (the distance from the vehicle 100 to the front approaching vehicle and the orientation of the front approaching vehicle from the perspective of the vehicle 100) and the relative speed of the front approaching vehicle in relation to the vehicle 100 to calculate the amount of time required for the front approaching vehicle to arrive at the target area Ab for BSM control, under a presumption that the relative speed is fixed. The time acquiring unit 26 then calculates the time at which the required amount of time has elapsed from the current time as the estimated arrival time Ts.

As described above, according to the present embodiment, regarding the front side boundary of the target area Ab, when the overall other vehicle TA1 is present further within the boundary of the target area Ab, the other vehicle TA1 is determined to be present within the target area Ab. BSM control is thereby performed. Therefore, the front approaching vehicle arriving at the target area Ab for BSM control means that the overall front approaching vehicle has entered the target area Ab.

However, regarding the front side boundary of the target area Ab, when at least a part of the other vehicle TA1 is present further within the boundary of the target area Ab, the other vehicle TA1 may be determined to be present within the target area Ab. BSM control may thereby be performed. In this instance, the front approaching vehicle arriving at the target area Ab for BSM control means that at least a part of the front approaching vehicle is within the target area Ab. In addition, the control unit 12 of the front millimeter-wave radar 10 may calculate the estimated arrival time Ts. The time acquiring unit 26 may then acquire the calculated estimated arrival time Ts from the control unit 12.

The time acquiring unit 26 further acquires an estimated time at which the front approaching vehicle will exit the target area Ab for BSM control (referred to, hereinafter, as an "estimated exit time Te"). The time acquiring unit 26 then stores the estimated exit time Te in a predetermined storage area (step S230). The estimated exit time Te corresponds to a second time in the present disclosure.

The time acquiring unit 26 calculates the amount of time required for the front approaching vehicle to pass through the target area Ab for BSM control, under a presumption that the relative speed of the front approaching vehicle in relation to the vehicle 100 is fixed. The time acquiring unit 26 then calculates the time at which the required amount of time has elapsed from the estimated arrival time Ts as the estimated exit time Te.

As described above, according to the present embodiment, regarding the rear side boundary of the target area Ab, when at least a part of other vehicle TA1 is present further within the boundary of the target area Ab, the other vehicle TA1 is determined to be present within the target area Ab. BSM control is thereby performed.

Therefore, the front approaching vehicle exiting the target area Ab for BSM control means that the overall front approaching vehicle has exited the target area Ab. However, regarding the rear side boundary of the target area Ab, when the overall other vehicle TA1 is present further within the boundary of the target area Ab, the other vehicle TA1 may be determined to be present within the target area Ab. BSM control is thereby performed.

In this instance, the front approaching vehicle exiting the target area Ab for BSM control means that at least a part of the front approaching vehicle has exited the target area Ab. In addition, the control unit 12 of the front millimeter-wave radar 10 may calculate the estimated exit time Te. The time acquiring unit 26 may then acquire the calculated estimated exit time Ts from the control unit 12.

Next, the BSM control unit 23 determines whether or not the current time is before the estimated arrival time Ts (step S240). When determined that the current time is before the estimated arrival time Ts (the estimated arrival time Ts is not yet reached) (YES at step S240), the other vehicle TA that has been detected as the front approaching vehicle at step S210 is predicted to have not yet reached the target area Ab. Therefore, the sensitivity setting unit 27 of the BSM control unit 23 sets vehicle detection sensitivity for BSM control to a normal level (step S290). The levels of vehicle detection sensitivity are the normal level and a high-sensitivity level.

Here, when the vehicle detection sensitivity for BSM control is set to the high-sensitivity level, detection sensitivity of the other vehicle TA is higher compared to the normal level. A high detection sensitivity of the other vehicle TA means that the likelihood is high that the other vehicle TA is determined to be present when the other vehicle TA is present within the target area Ab for BSM control.

Conversely, a low detection sensitivity of the other vehicle TA means that the likelihood is low that the other vehicle TA is erroneously determined to be present when the other vehicle TA is not present within the target area Ab for BSM control. In other words, when the vehicle detection sensitivity is set to the high-sensitivity level, the capability for reliably detecting the other vehicle TA when the other vehicle TA is present within the target area Ab (referred to, hereinafter, as "ON capability") is high, compared to when the vehicle detection sensitivity is set to the normal level.

Conversely, the capability for suppressing erroneous determination that the other vehicle TA is present when the other vehicle TA is not present within the target area Ab (referred to, hereinafter, as "OFF capability") becomes low. Specific setting of the vehicle detection sensitivity for BSM control will be described hereafter.

After the vehicle detection sensitivity is set, the BSM control unit 23 determines whether or not the other vehicle TA is present within the target area Ab for BSM control (step S300). When determined that the other vehicle TA is present (YES at step S300), the BSM control unit 23 makes the vehicle 100 perform control, described above, to notify the driver that the other vehicle TA is present within the target area Ab (step S310).

The BSM control unit 23 then returns to the process in FIG. 5. At this time, the BSM control unit 23 functions as an operation control unit in the present disclosure. On the other hand, when determined that the other vehicle TA is not present within the target area Ab for BSM control (NO at step S300), the BSM control unit 23 returns to the process in FIG. 5 without making the vehicle 100 perform BSM control (skips step S310). After returning to the process in FIG. 5, when determined that the predetermined amount of time has elapsed (YES at step S120), the driving assistance system ECU 40 similarly performs the processes at step S130 and subsequent steps.

At step S210 in the BSM control process (FIG. 6), when determined that a front approaching vehicle is not present (NO at step S210), the BSM control unit 23 determines whether or not the estimated arrival time Ts and the estimated exit time Te are stored (step S270). When determined that the estimated arrival time Ts and the estimated exit time Te are not stored (NO at step S270), the sensitivity setting unit 27 of the BSM control unit 23 sets the vehicle detection sensitivity for BSM control to the normal level (step S290). The BSM control unit 23 then similarly performs the processes at step S300 and subsequent steps.

However, when determined that the estimated arrival time Ts and the estimated exit time Te are stored (YES at step S270), the BSM control unit 23 determines whether or not the current time is before the estimated arrival time Ts (step S240). In FIG. 3, when the second other vehicle TA2 has relatively moved from the position TA2(1) to the position TA2(2), the front approaching vehicle is determined not to be present at step S210.

However, the estimated arrival time Ts and the estimated exit time Te estimated when the second other vehicle TA2 is in the position TA2(1) are stored. In such instances, when determined that the current time is before the estimated arrival time Ts (YES at step S240), the other vehicle TA that has been detected as the front approaching vehicle at step S210 is predicted to have not yet reached the target area Ab. Therefore, in this instance as well, the sensitivity setting unit 27 of the BSM control unit 23 sets the vehicle detection sensitivity for BSM control to the normal level (step S290). The BSM control unit 23 then similarly performs the processes at step S300 and subsequent steps.

On the other hand, when determined that the estimated arrival time Ts and the estimated exit time Te are stored (YES at step S270) and also that the current time is after the estimated arrival time Ts (the estimated arrival time Ts is already reached) (NO at step S240), the BSM control unit 23 determines whether or not the current time is after the estimated exit time Te (step S250).

When determined that the current time is not after the estimated exit time Te (the estimated exit time Te is not yet reached) (NO at step S250), the other vehicle TA that has been detected as the front approaching vehicle at step S210 is predicted to have reached the target area Ab and not exited the target area Ab. Therefore, the sensitivity setting unit 27 of the BSM control unit 23 sets the vehicle detection sensitivity for BSM control to the high-sensitivity level (step S260). After setting the vehicle sensitivity level, the BSM control unit 23 similarly performs the processes at step S300 and subsequent steps.

When determined that the front approaching vehicle is not present (NO at step S210), that the estimated arrival time Ts and the estimated exit time Te are stored (YES at step S270), that the current time is after the estimated arrival time Ts (the estimated arrival time Ts is already reached) (NO at step S240), and also that the current time is after the estimated exit time Te (YES at step S250), the other vehicle TA that has been detected as the front approaching vehicle at step S210 is predicted to have already passed through the target area Ab and exited the target area Ab. At this time, the time acquiring unit 26 clears the stored estimated arrival time Ts and estimated exit time Te (step S280). The sensitivity setting unit 27 sets the vehicle detection sensitivity in BSM control to the normal level (step S290). The BSM control unit 23 then similarly performs the processes at step S300 and subsequent steps.

A-3. Vehicle Detection Sensitivity in BSM Control

Figure 7:
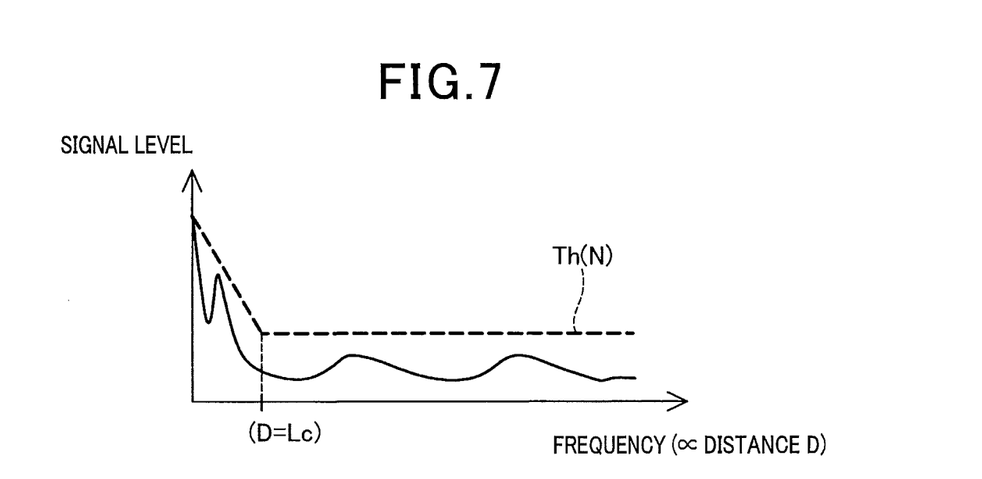
FIG. 7 is an explanatory diagram of detection sensitivity in BSM control.
Figure 8:
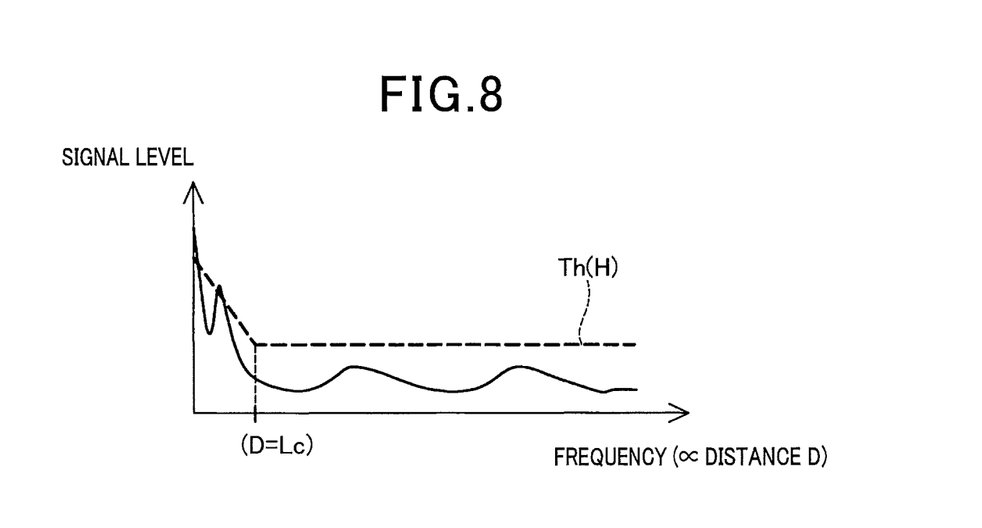
FIG. 8 is an explanatory diagram of detection sensitivity in BSM control.

FIGS. 7 and 8 show examples of reception signal waveforms of the rear side millimeter wave radar 20 used for BSM control. The horizontal axes both FIG. 7 and FIG. 8 indicate the frequency of the reception signal. The frequency is proportional to a distance D from the vehicle 100. The vertical axes indicate the signal level (strength) at each frequency of the reception signal. In addition, a threshold Th shown by the broken line indicates a threshold used for peak detection in BSM control. The BSM control unit 23 (FIG. 2) determines that another vehicle TA is present at the distance corresponding to the frequency of a peak at which the level of the reception signal of the rear side millimeter-wave radar 20 exceeds the threshold Th.

FIGS. 7 and 8 show examples of the same reception signal of the rear side millimeter-wave radar 20. In addition, FIG. 7 shows an example of a threshold (referred to, hereinafter, as a "first threshold Th(N)") when the vehicle detection sensitivity for BSM control is set to the normal level at step S290 in FIG. 6. FIG. 8. shows an example of a threshold (referred to, hereinafter, as a "first threshold Th(H)") when the vehicle detection sensitivity for BSM control is set to the high-sensitivity level at step S260 in FIG. 6. The value of the second threshold Th(H) becomes low in an area closer to the vehicle 100 (where the distance D from the vehicle 100 is Lc or shorter), compared to the first threshold Th(N). The area corresponds to a part of the front target area Ab(f) or the overall front target area Ab(f) (see FIG. 3). The front target area Ab(f) is a part of the target area Ab for BSM control on the front side. In the remaining area, the second threshold Th(H) is the same value as the first threshold Th(N).

When the vehicle detection sensitivity is set to the normal level, the first threshold Th(N) is used for BSM control. Therefore, in the example shown in FIG. 7, the level of the reception signal does not exceed the first threshold Th(N). A determination is made that another vehicle TA is not present in the target area Ab. On the other hand, when the vehicle detection sensitivity is set to the high-sensitivity level, the second threshold Th(H) is used for BSM control. Therefore, in the example shown in FIG. 8, a determination is made that another vehicle TA is present in a position corresponding to the peak portion at which the level of the reception signal exceeds the second threshold Th(H).

In this way, in the vehicle 100 according to the present embodiment, the vehicle detection sensitivity for BSM control is set to the high-sensitivity level during the period (predetermined period) from the estimated time at which the front approaching vehicle will arrive at the target area Ab for BSM control (the estimated arrival time Ts) to the estimated time at which the front approaching vehicle will exit the target area Ab for BSM control (the estimated exit time Te).

In addition, when the vehicle detection sensitivity is set to the high-sensitivity level, the other vehicle TA is more easily detected in the front target area Ab(f) within the target area Ab for BSM control, compared to when the vehicle detection sensitivity is set to the normal level.

Therefore, even when the other vehicle TA2 enters the target area Ab from the front in accompaniment with the other vehicle TA2 being overtaken by the vehicle 100, in a manner similar to the second other vehicle TA2 in FIG. 3, the likelihood of the other vehicle TA2 being detected in BSM control can be increased. Therefore, in the vehicle 100 according to the present embodiment, the capability (ON capability) for reliably detecting the other vehicle TA when the other vehicle TA is present within the target area Ab for BSM control can be improved.

According to the present embodiment, in the area other than the front target area Ab(f) within the target area Ab for BSM control (rear area), the second threshold Th(H) is the same value as the first threshold Th(N). Therefore, even when the vehicle detection sensitivity is set to the high-sensitivity level, the ease with which the other vehicle TA in the area other than the front target area is detected is the same as when the detection sensitivity is set to the normal level.

In a manner similar to the first other vehicle TA1 in FIG. 3, when the other vehicle TA1 enters the target area Ab from behind in accompaniment with the other vehicle TA1 overtaking the vehicle 100, the other vehicle TA1 is present within the detection range of the rear side millimeter-wave radar 20 before entering the target area Ab for BSM control. In addition, the other vehicle TA1 enters the target area Ab by passing through a position at which the sensitivity of the rear side millimeter-wave radar 20 is relatively high.

Therefore, the other vehicle TA1, such as that described above, can be reliably detected without decreasing the threshold in the area other than the front target area Ab(f). Furthermore, as a result of the threshold not being decreased in the area other than the front target area Ab(f), the capability (OFF capability) for suppressing erroneous determination that the other vehicle TA is present when the other vehicle TA is not present can be maintained.

In addition, in the vehicle 100 according to the present embodiment, during the period other than the period from the estimated arrival time Ts to the estimated exit time Te, the vehicle detection sensitivity for BSM control is set to the normal level. During this period, it is expected that a situation will not occur in which the other vehicle TA2 enters the target area Ab from the front in accompaniment with the other vehicle TA2 being overtaken by the vehicle 100, in a manner similar to the second other vehicle TA2 in FIG. 3. Therefore, reduction of OFF capability can be suppressed without reducing ON capability, even when the vehicle detection sensitivity is set to the normal level.

In addition, a high vehicle detection sensitivity for BSM control means that, when determining whether an object detected in the target area Ab is another vehicle TA or another object such as a wall Wa, the likelihood of the object being determined to be another vehicle TA is also high.

Specifically, for example, when the vehicle detection sensitivity is set to the normal level, determination of whether the object is another vehicle TA or another object such as a wall Wa (intermediate determination) is performed N times (N being an integer of 2 or higher). The certainty of the determination is evaluated based on the results of the N number of intermediate determinations. A final determination result is thereby derived. However, when the vehicle detection sensitivity is set to the high-sensitivity level, the number of times that the intermediate determination is performed is decreased to (N-k) times (k being an integer of 1 or higher). The likelihood of the object being determined to be another vehicle TA is increased.

As described above, in the vehicle 100 according to the present embodiment, the vehicle detection sensitivity for BSM control is set to the high-sensitivity level during the period from the estimated arrival time Ts to the estimated exit time Te. Therefore, when the other vehicle TA2 enters the target area Ab from the front in accompaniment with the other vehicle TA2 being overtaken by the vehicle 100, in a manner similar to the second other vehicle TA2 in FIG. 3, the likelihood of the other vehicle TA2 being determined to be another vehicle rather than a wall Wa can be increased.

In addition, the vehicle detection sensitivity for BSM control is set to the normal level during the period other than the period from the estimated arrival time Ts to the estimated exit time Te. Therefore, as shown in FIG. 4, when the cruising vehicle 100 approaches an area on the road in which a wall Wa is present from an area in which the wall Wa is not present, a situation can be suppressed in BSM control in which a determination is made that another vehicle TA is present within the target area Ab and an unnecessary notification operation is performed.

Figure 9:
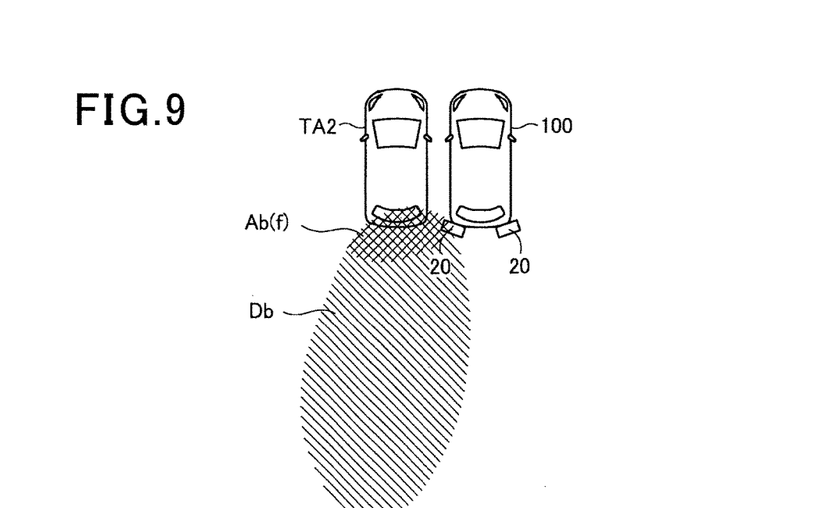
FIG. 9 is an explanatory diagram of detection sensitivity in BSM control.

Other methods can be used as the method for setting the detection accuracy in BSM. For example, when the vehicle detection sensitivity is set to the normal level, as described above, the rear side millimeter-wave radar 20 is set so that the sensitivity becomes higher further to the rear of the target area Ab for BSM control. However, as shown in FIG. 9, when the vehicle detection sensitivity is set to the high-sensitivity level, a beam may be concentrated in a part of the front target area Ab(f) or the overall front target area Ab(f) for BSM control. Gain in the direction of the front target area Ab(f) may be increased. Peak sensitivity setting (change) such as this can be actualized through use of a phased array radar, for example.

Figure 10:
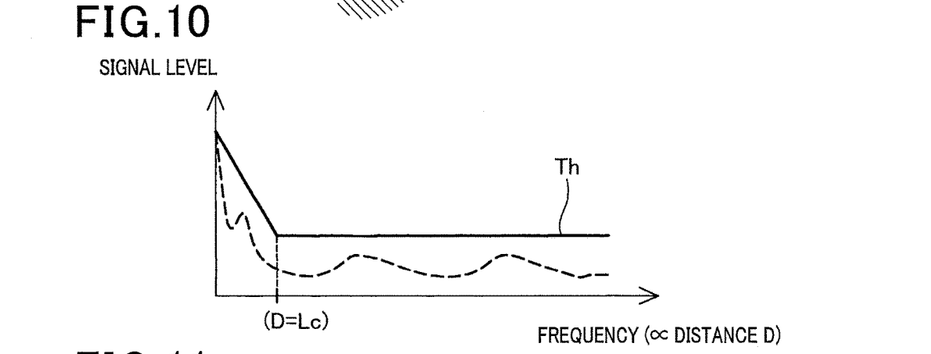
FIG. 10 is an explanatory diagram of detection sensitivity in BSM control.
Figure 11:
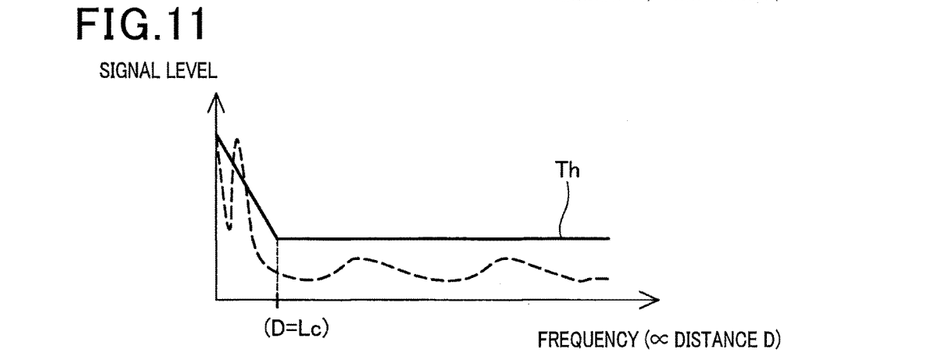
FIG. 11 is an explanatory diagram of detection sensitivity in BSM control.

As a result, when the reception signal of the rear side millimeter-radar 20 when the vehicle detection sensitivity is set to the normal level is as shown in FIG. 10, the signal level of the reception signal increases in the area corresponding to the front target area Ab(f) for BSM control (where the distance D from the vehicle 100 is Lc or shorter) when the vehicle detection sensitivity is changed to the high-sensitivity level. Therefore, even when determination is performed using the same threshold Th, when the vehicle detection sensitivity is set to the high-sensitivity level, the other vehicle TA is more easily detected in the front target area Ab(f) for BSM control, compared to when the vehicle detection sensitivity is set to the normal level.

As described above, in the vehicle 100 according to the present embodiment, detection of a front approaching vehicle is performed. The estimated arrival time Ts at which the front approaching vehicle arrives at the target area Ab for BSM control and the estimated exit time Te at which the front approaching vehicle exits the target area Ab are estimated. The detection sensitivity of the other vehicle TA in the front target area Ab(f) within the target area Ab is set in such a manner that the detection sensitivity during the predetermined period from the estimated arrival time Ts to the estimated exit time Te is higher than the detection sensitivity during a remaining period other than the predetermined period. Therefore, in the vehicle 100 according to the present embodiment, the capabilities (ON capability and OFF capability) of BSM control can be improved as described above.

In addition, in the vehicle 100 according to the present embodiment, the sensor unit 21 of the rear side millimeter-wave radar 20 is used for both BSM control and LCA control. Simplification of equipment and cost reduction of the vehicle 100 are thereby actualized. However, even in a configuration such as this, the capabilities (ON capability and OFF capability) of BSM control can be improved by setting the detection sensitivity for BSM control as described above.

B. Variation Examples

B-1. First Variation Example

The configuration of the vehicle 100 according to the above-described embodiment is merely an example. Various modifications to the configuration of the vehicle 100 are possible. For example, according to the above-described embodiment, the millimeter-wave radars 10 and 20 are used to detect the object ahead of the vehicle 100, and behind and on the left and right sides of the vehicle 100.

However, other sensors, such as a camera, may be used instead of the millimeter-wave radars 10 and 20. Alternatively, a plurality of types of sensors (such as a millimeter-wave radar and a camera) may be used to improve the accuracy of object detection. In addition, according to the above-described embodiment, two sensors (millimeter-wave radars 20) are used to detect an object behind and on the left and right sides of the vehicle 100. However, the object behind and on the left and right sides of the vehicle 100 may be detected using only a single sensor, or three or more sensors.

In addition, according to the above-described embodiment, the driving assistance system ECU 40 includes the PCS control unit 42. However, the driving assistance system ECU 40 may not include the PCS control unit and may not perform PCS control.

In addition, the driving assistance system ECU 40 may be capable of performing driving assistance control other than the above-described driving assistance control. Other driving assistance control includes adaptive cruise control (referred to, hereinafter, as "ACC"), lane keep assist (referred to, hereinafter, as "LKA"), lane departure warning (referred to, hereinafter, as "LDW"), rear cross traffic alert (referred to, hereinafter, as "RCTA"), and the like. ACC, LKA, and LDW are performed using, for example, the detection results from the front millimeter-wave radar 10. In addition, RCTA is performed using, for example, the detection results from the rear side millimeter wave radars 20. Driving assistance control performed by the vehicle 100 can be arbitrarily set as long as detection of the front approaching vehicle is performed. For example, the vehicle 100 may perform ACC control but not PCS control.

In addition, according to the above-described embodiment, the control unit 22 of the rear side radar 20 performs BSM control and LCA control. However, the driving assistance system ECU 40 may perform at least either of BSM control and LCA control. Furthermore, according to the above-described embodiment, the rear side radar 20 directly controls the LED light 32. However, the rear side radar 20 may control the LED light 32 via another ECU.

B-2. Second Variation Example

The details of BSM control, LCA control, and PCS control (operations that the vehicle 100 is made to performed) described according to the above-described embodiment are merely examples. The vehicle 100 may be made to perform other operations through BSM control, LCA control, and PCS control.

B-3. Third Variation Example

The target area Ab for BSM control and the target area Al for LCA control according to the above-described embodiment are merely examples. Various modifications are possible. For example, the target areas Ab and Al are not required to be encompassed within vehicle lanes (Lr and Ll in FIG. 3) adjacent to the vehicle lane (Lc in FIG. 3) in which the vehicle 100 is traveling. The target areas Ab and Al may include areas outside of the adjacent vehicle lanes. In addition, the boundary positions of the target areas Ab and Al in the forward advancing direction and the reverse direction of the vehicle 100 can be arbitrarily set as long as the target area Al is positioned to the rear of the target area Ab. The target area Al being positioned to the rear of the target area Ab does not exclude a portion on the front side of the target area Al overlapping a portion on the rear side of the target area Ab.

B-4. Fourth Variation Example

The details of the BSM control process (FIG. 6) and the driving assistance control process (FIG. 5) according to the above-described embodiment are merely examples. Various modifications are possible. For example, in the BSM control process according to the above-described embodiment, the front approaching vehicle is another vehicle TA that is relatively nearing the vehicle 100 in the adjacent vehicle lane Lr or Ll ahead of the vehicle 100. However, the front approaching vehicle is not limited to a vehicle that is traveling in the adjacent vehicle lane Lr or Ll. The front approaching vehicle may be another vehicle TA that is relatively nearing the vehicle 100 ahead of the vehicle 100 in general. As a result, in BSM control, another vehicle TA can be detected with high accuracy even when the vehicle 100 overtakes the other vehicle TA while changing vehicle lanes.

In addition, according to the above-described embodiment, when the vehicle detection sensitivity is set to the high-sensitivity level, the other vehicle TA is more easily detected in only a portion of the target area Ab for BSM control near the vehicle 100 (the front target area Ab(f)), compared to when the vehicle detection sensitivity is set to the normal level. However, the other vehicle TA may be more easily detected in an arbitrary portion of the target area Ab for BSM control. Alternatively, the other vehicle TA may be more easily detected throughout the overall target area Ab for BSM control.

In addition, according to the above-described embodiment, the period during which the detection sensitivity for BSM control is set to the high-sensitivity level (referred to, hereinafter, as a high sensitivity period) is the period from the estimated arrival time Ts to the estimated exit time Te. However, the high sensitivity period may be set to other periods set based on the estimated arrival time Ts. For example, the high sensitivity period may be a period from the estimated arrival time Ts until the elapse of an amount of time that is set in advance. In this instance, the time acquiring unit 26 is not required to acquire the estimated exit time Te. The above-described amount of time set in advance may be an amount of time that is generally considered to be required for the other vehicle TA to pass through the target area Ab when the vehicle 100 overtakes the other vehicle TA.

Alternatively, the high sensitivity period may be a period from a time prior to the estimated arrival time Ts by an amount of time that is set in advance to a time after the estimated exit time Te by an amount of time that is set in advance. As a result, ON capability of BSM control can be further improved. Conversely, the high sensitivity period may be a period from a time after the estimated arrival time Ts by an amount of time that is set in advance to a time prior to the estimated exit time Te by an amount of time that is set in advance. As a result, reduced OFF capability of BSM control can be suppressed with more certainty.

In addition, in the driving assistance control process according to the above-described embodiment, LCA control may be performed after the rear side detection process. Furthermore, in the driving assistance control process according to the above-described embodiment, the order in which the various control processes are performed can be changed as appropriate. Moreover, the various control processes may be performed in parallel.

B-5. Fifth Variation Example

According to the above-described embodiment, an instance is described in which a single front approaching vehicle is detected. However, when a plurality of front approaching vehicles are detected, the estimated arrival time Ts and the estimated exit time Te may be estimated for each front approaching vehicle. Control similar to those described above may then be performed. Alternatively, the plurality of front approaching vehicles may be considered to be a single line of vehicles. The estimated arrival time Ts and the estimated exit time Te may be estimated for the single line of vehicles. Control similar to those described above may then be performed.

The present disclosure is not limited to the above-described embodiment and variation examples. The present disclosure can be actualized by various configurations without departing from the scope of the disclosure. For example, the technical features in the embodiment and variation examples corresponding to the technical features of each aspect described in the Summary can be exchanged or combined as appropriate to solve some or all of the above-described issues or to achieve some or all of the above-described effects. In addition, unless stated in the present specification as being an essential feature, the technical features can be omitted as appropriate.

What is claimed is:

1. A vehicle control apparatus comprising:
   a rear side radar that detects an object behind and to a side of an own vehicle to which the vehicle control apparatus is mounted;
   a front radar that detects an object ahead of the own vehicle;
   a processor configured to:
   acquire detection results of the rear side radar;
   acquire detection results of the front radar;
   detect another vehicle that is present in a first area behind and to a side of the own vehicle based on the detection results of the rear side radar;
   estimate, based on the detection results of the front radar, a first time that is a time at which a front approaching vehicle will arrive at the first area and a second time that is a time at which the front approaching vehicle will exit the first area, the front approaching vehicle relatively nearing the own vehicle from ahead of the own vehicle, the front approaching vehicle being detected as the another vehicle in the first area;
   set a detection sensitivity of the processor to the another vehicle in at least a part of the first area in such a manner that the detection sensitivity during a predetermined period is higher than the detection sensitivity during a period other than the predetermined period, the predetermined period being set to any one of: a period from the first time until an elapse of a preset amount of time; a period from the first time to the second time; and a period from a point in time prior to or after the first time by a preset amount of time to a point in time prior to or after the second time by an preset amount of time; and
   detect the another vehicle with the set detection sensitivity.

2. The vehicle control apparatus according to claim 1, wherein
   the processor is further configured to set the detection sensitivity to the another vehicle in a part of the first area at a side near the own vehicle in such a manner that the detection sensitivity during the predetermined period is higher than the detection sensitivity during the period other than the predetermined period.

3. The vehicle control apparatus according to claim 2, wherein
   the processor is further configured to acquire (i) a distance between the own vehicle and the front approaching vehicle and (ii) a relative speed of the front approaching vehicle in relation to the own vehicle, and estimate the first time based on the distance and the relative speed.

4. The vehicle control apparatus according to claim 3, wherein:
   the processor is further configured to estimate the second time that is an estimated time at which a front approaching vehicle will exit the first area; and
   the predetermined period is set based on the first time and the second time.

5. The vehicle control apparatus according to claim 4, wherein
   the processor is further configured to:
   detect a vehicle that is present in a second area behind the first area, based on the detection results of the rear side radar.

6. The vehicle control apparatus according to claim 5, wherein:
   the processor is further configured to cause the own vehicle to perform a predetermined notification operation when a vehicle is detected by the processor.

7. The vehicle control apparatus according to claim 1, wherein
   the processor is further configured to acquire (i) a distance between the own vehicle and the front approaching vehicle and (ii) a relative speed of the front approaching vehicle in relation to the own vehicle, and estimate the first time based on the distance and the relative speed.

8. The vehicle control apparatus according to claim 1, wherein:
the processor is further configured to estimate the second time that is an estimated time at which a front approaching vehicle will exit the first area; and
the predetermined period is set based on the first time and the second time.

9. The vehicle control apparatus according to claim 1, wherein
the processor is further configured to:
detect a vehicle that is present in a second area behind the first area, based on the detection results of the rear side radar.

10. The vehicle control apparatus according to claim 1, wherein:
the processor is further configured to cause the own vehicle to perform a predetermined notification operation when a vehicle is detected by the processor.

11. A vehicle control method comprising:
detecting, with a rear side radar, an object behind and to a side of an own vehicle;
detecting, with a front radar, an object ahead of the own vehicle;
acquiring, by a processor provided in a vehicle control apparatus mounted to the own vehicle, detection results of the rear side radar;
acquiring, by the processor, detection results of the front radar;
detecting, by the processor, another vehicle that is present in a first area behind and to a side of the own vehicle, based on the detection results of the rear side radar;
estimating, by the processor, based on the detection results of the front radar, a first time that is a time at which a front approaching vehicle will arrive at the first area and a second time that is an estimated time at which the front approaching vehicle will exit the first area, the front approaching vehicle relatively nearing the own vehicle from ahead of the own vehicle, the front approaching vehicle being detected as the another vehicle in the first area;
setting, by the processor, a detection sensitivity of the processor to the another vehicle in at least a part of the first area in such a manner that the detection sensitivity during a predetermined period is higher than the detection sensitivity during a period other than the predetermined period, the predetermined period being set to any one of: a period from the first time until an elapse of a preset amount of time; a period from the first time to the second time; and a period from a point in time prior to or after the first time by a preset amount of time to a point in time prior to or after the second time by an preset amount of time; and
detecting, by the processor, the another vehicle with the set detection sensitivity.

* * * * *